(Model.)

G. D. PAUL.
FARE BOX.

No. 250,387. Patented Dec. 6, 1881.

WITNESSES
E. D. Nottingham
Herman Moran

INVENTOR
Geo. D. Paul.
By Leggett & Leggett
ATTORNEYS

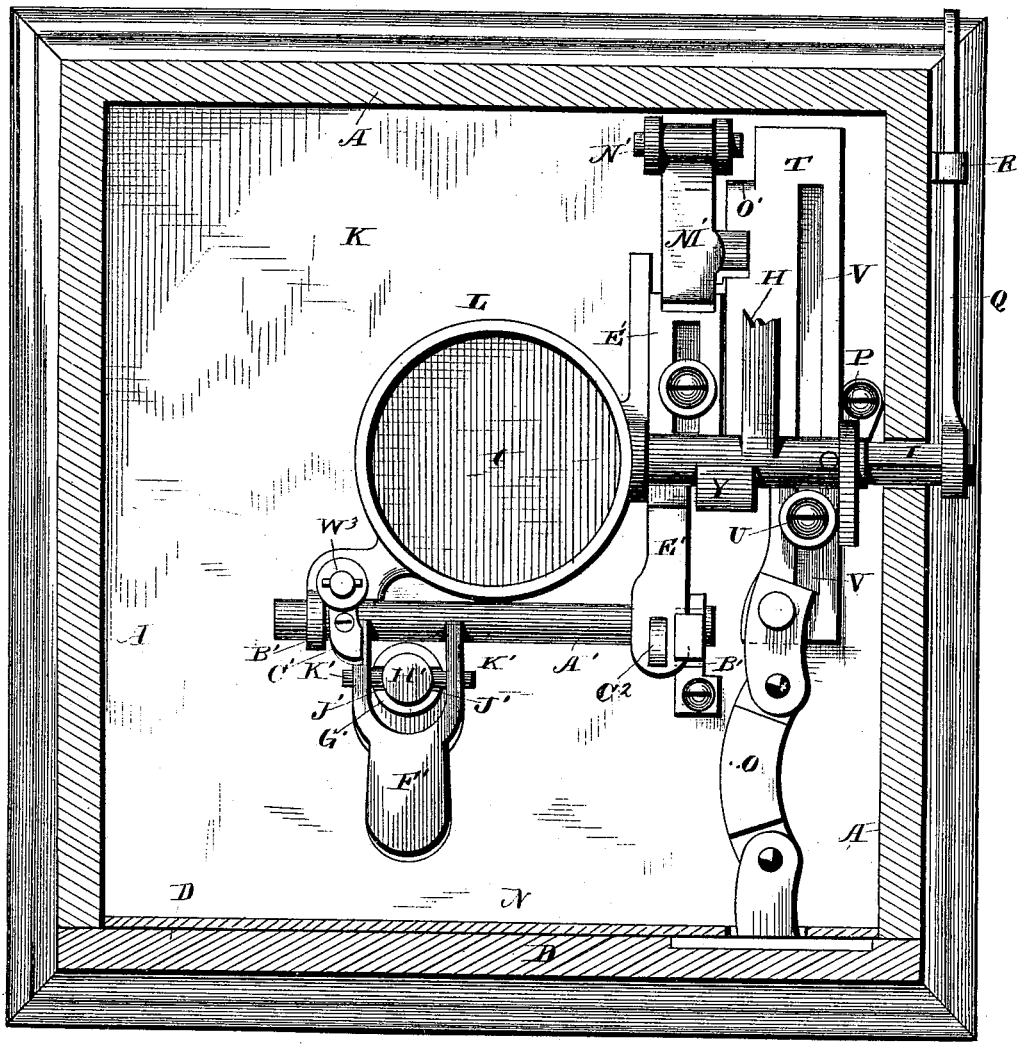

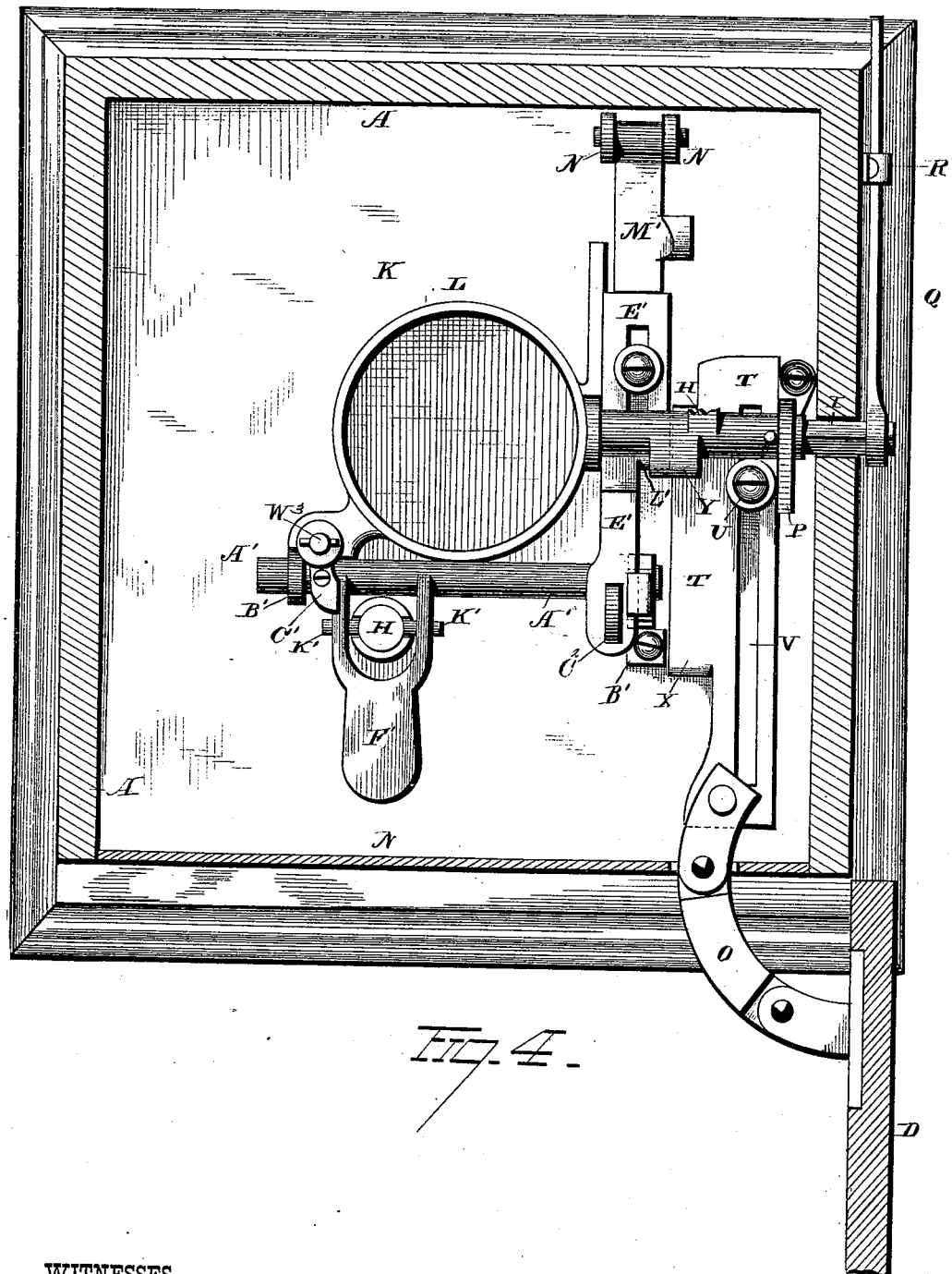

(Model.)
G. D. PAUL.
FARE BOX.
No. 250,387. Patented Dec. 6, 1881.
6 Sheets—Sheet 5.
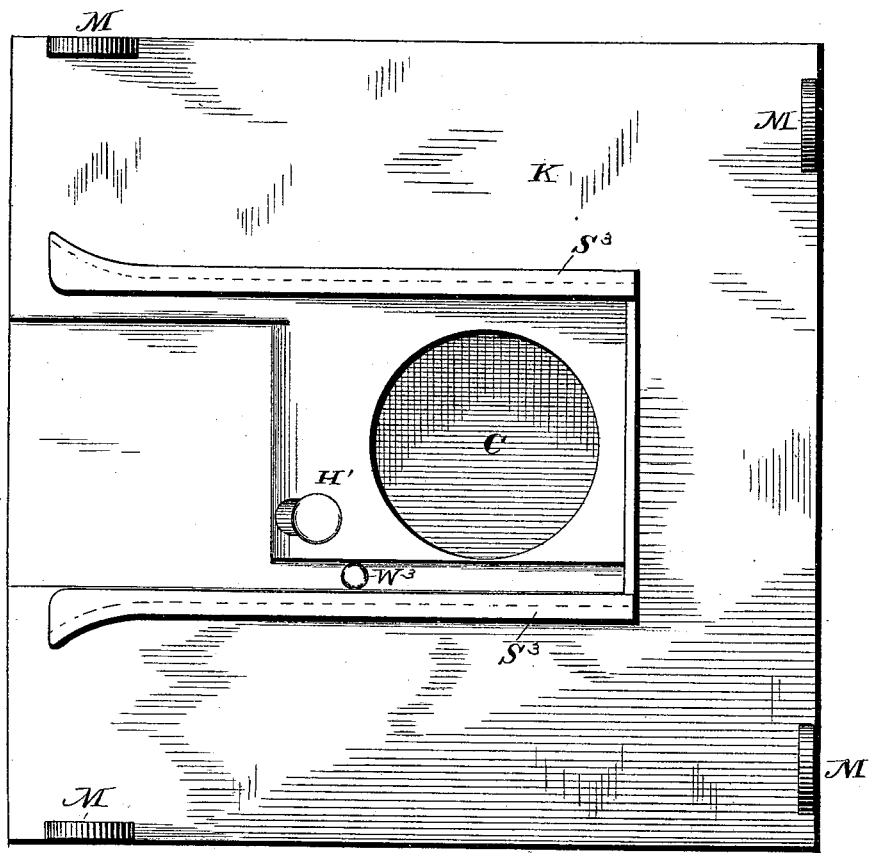

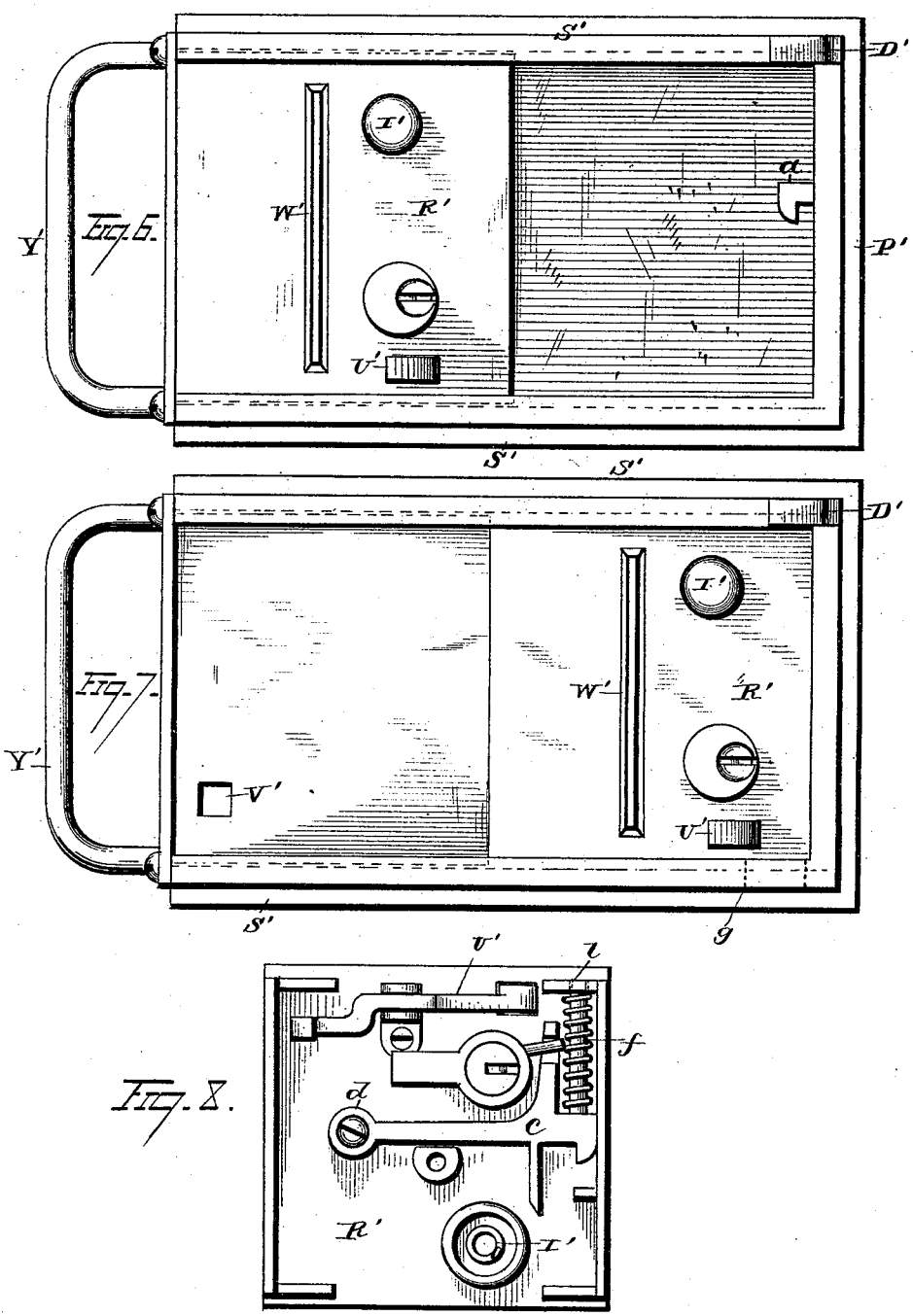

UNITED STATES PATENT OFFICE.

GEORGE D. PAUL, OF NEW YORK, N. Y., ASSIGNOR TO THE PAUL SECURITY BOX COMPANY, OF SAME PLACE.

FARE-BOX.

SPECIFICATION forming part of Letters Patent No. 250,387, dated December 6, 1881.

Application filed May 23, 1881. (Model.)

*To all whom it may concern:*

Be it known that I, GEORGE D. PAUL, of New York, in the county of New York and State of New York, have invented certain new and useful Improvements in Fare-Boxes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in fare-boxes, the object of the same being to secure the safe transfer of fares from the boxes to the main office, and also to prevent the tilting platform from being turned and any money purposely left thereon from being extracted when the door leading to the interior of the box is opened, or when the receiving-bag has been withdrawn therefrom.

With these ends in view my invention consists in certain details in construction and combinations of parts, as will be more fully explained, and pointed out in the claims.

Figure 1:
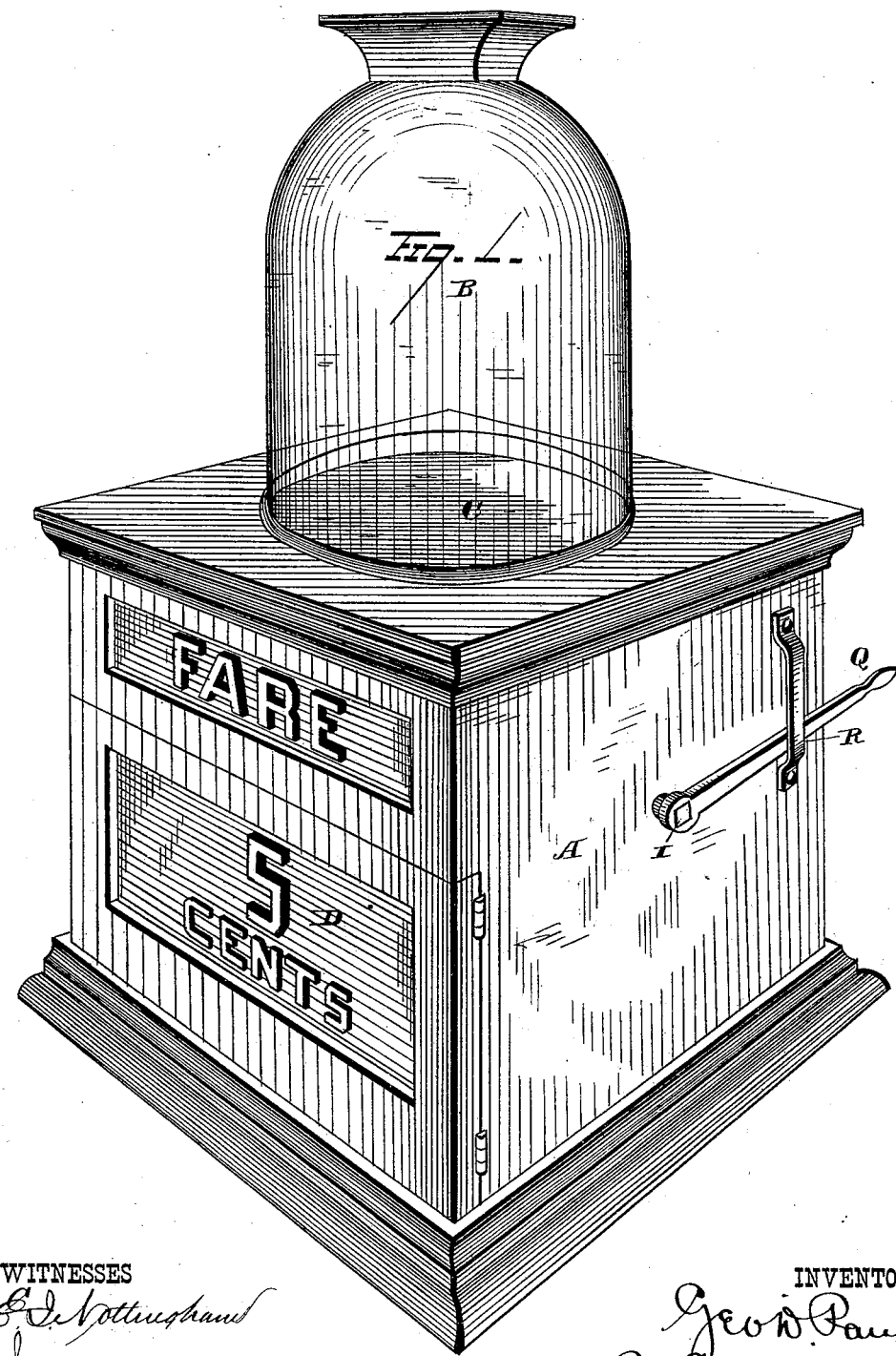
Figure 2:
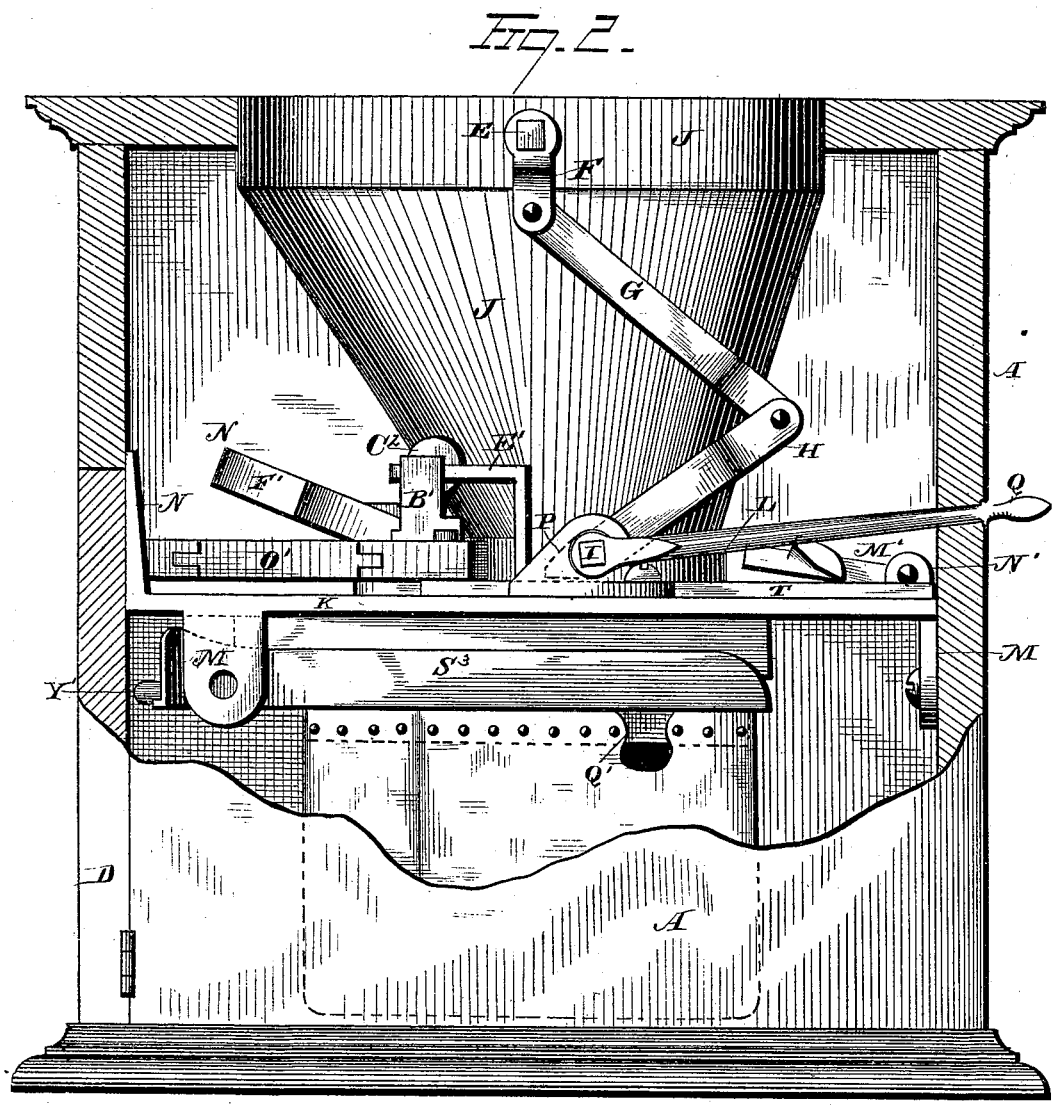

In the accompanying drawings, Figure 1 is a perspective view of my improved fare-box. Fig. 2 is a side view, with a portion of the box removed. Fig. 3 is a sectional plan, showing the arrangement of parts with the door open and the receiving-bag in position. Fig. 4 is a similar view, showing the arrangement of parts with the door open and the receiving-bag withdrawn. Fig. 5 is a view of the plate having the guides for the reception of the receiving-bag. Fig. 6 is a view of the mouth-piece and bag with the lock open. Fig. 7 is a view of the same with the lock closed; and Fig. 8 is a view of the interior of the lock.

A represents the fare-box, having a glass cover, B, for inspecting the articles dropped onto the tilting platform C, and a door, D, which opens into the interior, for removing and replacing the receiving drawer or bag.

The tilting platform C is rigidly secured to a rock-shaft, E, the latter having a crank, F, secured thereto, with which a link, G, pivotally secured to the arm H of the rock-shaft I, engages and operates said tilting platform.

The rock-shaft E, supporting the tilting platform, has bearing in the upper end of the chute J, which latter may be of any desired shape and size, having a large upper opening and a small lower one, which is located immediately over an opening of the same size in the plate K, through which the fares drop into the receiving drawer or bag. The chute J is firmly secured to a flange, L, on the plate K, which holds the chute in an upright position, the said plate being secured to the box by screws, which pass through the projecting lugs M into the sides of the box A. The metallic plate K, before referred to, is provided on its upper surface with a flange, N, through which the jointed connecting-link O passes, and also affords attachment for the mechanism employed for automatically locking the tilting platform, and is provided on its under surface with guides in which the mouth-piece of the drawer or bag is slid and held in position.

The link G, above referred to, is attached at its lower end to the arm H on the rock-shaft I, the latter being journaled at one end in the side of the flange L, and at the opposite end in a bearing, P, on the upper surface of the plate K, the outer end of said rock-shaft I passing through the side of the box and terminating in a square shoulder, on which the operating-lever Q is placed. This operating-lever works in a guideway, R, secured to the side of the box, which limits the movement thereof and holds the tilting platform in a horizontal position, the weight of the said operating-lever being sufficient to bring the tilting platform horizontal, where it is held by the lower side of the operating-lever resting on the guide R.

The mechanism for automatically locking the tilting platform when the door D is opened consists of a sliding plate adapted to be moved, by opening the door, under a lug on the rock-shaft I, which prevents the rock-shaft from turning, and consequently the tilting platform from being turned.

T is a sliding bolt or plate situated on the upper surface of the plate K, and held thereon by the screw U, which rests in the oblong slot V in the plate T, and forms a guide for the said plate, and at the same time holds the same in position. This sliding bolt or plate is connected to the door D, near its hinged side, by a jointed connecting-link, O, which transmits every movement of the door D to the sliding plate T, and effectually locks the tilting platform, when the door is opened, by bringing the corner X of the said plate under the lug Y on the rock-shaft I, which prevents the operating-lever from being lifted.

If the tilting platform should by any accident be in a vertical instead of a horizontal position when it is desired to open the door, the corner X of the sliding plate T strikes the lug Y and brings the tilting platform to a horizontal position. The automatic mechanism for preventing the tilting of the platform when the receiving-bag is withdrawn, whether the door be closed or open, is also situated on the upper surface of the plate K, and is actuated by a disengaging-bolt penetrating the plate K, and adapted to come in contact with a spring-pressed stud on the mouth-piece, which operates a weighted rock-shaft, connected with a sliding plate adapted to be drawn under the lug Y, in conjunction with the sliding plate T, which releases a latch and allows it to lock the sliding plate when the mouth-piece is withdrawn. The tendency of this weighted rock-shaft is to constantly keep the tilting platform locked; but this tendency is overcome when the mouth-piece is inserted and the door is shut by the spring-arm on the same bearing upward against the disengaging-bolt which projects through the plate K and turns the weighted rock-shaft and throws the sliding plate from under the lug. The weight of this rock-shaft alone is sufficient to keep the platform locked when the door is closed and the bag is removed; but when the door is opened the sliding bolt or plate T releases the gravity-catch and locks the mechanism, which prevents any manipulations from the inside of the box. When the door is again closed the gravity-catch is raised, but the said sliding plate connected to the weighted rock-shaft continues to remain under the lug Y, it being sufficient in itself to keep the parts locked when the door is closed, and access to the interior of the box prevented.

A' is the weighted rock-shaft, journaled at opposite ends in the bearings B', the latter being secured to the upper surface of the plate K, one of said bearings extending upward and forming a sliding surface for the rear end of the sliding plate or bolt E'. This rock-shaft A' is provided on opposite ends with arms C' C², extending out at right angles thereto, which engage, respectively, with a downwardly-projecting arm, W³, adapted to come in contact with a cam, D', on the mouth-piece and the rear end of the sliding plate E', which is extended upward and slotted for this purpose. On the rear side of this rock-shaft A' the weight F' is secured, the latter being constructed to embrace a sleeve, G', in which moves the disengaging-bolt H', which engages with the spring-stud I' on the mouth-piece. This sleeve G' is provided with two longitudinal slits, J', in which the projections K' on the disengaging-bolt H' work, the said projections passing under the sides of the weight F' and forming a support for the same.

The sliding plate E' is held in position on the plate K by a lug passing up through an oblong slot in the same, and by a ridge formed integral with the plate K on one side and the sliding plate T on the opposite side. The sliding plate E' is provided with a corner, L', adapted to be brought under the lug Y when the weight on the rock-shaft is depressed. When the receiving-bag is placed in position the spring-pressed arm I' bears on the disengaging-bolt H' and elevates the weight, which turns the rock-shaft, and consequently drives the sliding plate E' forward from under the lug Y. As before stated, when the receiving-bag is withdrawn the weight F' falls, which draws the sliding plate E' under the lug, and retains it in that position until the bag has been replaced. When the door D is open and the receiving-bag withdrawn both the plates T and E' are under the lug, where they remain until the bag has been placed in position and the door closed.

M' is a gravity-catch, pivoted at one end in the bearings N', and adapted to rest on the front end of the sliding plate E' until the bag is removed and the door opened, when it falls down and firmly locks the plate E' until the door has been closed, when it is raised by the inclined end O' of the sliding plate T coming under the lug P' on the said catch M'. Whenever the door is opened the sliding plate T is drawn from under the lug P' on the gravity-catch, which allows the same to rest on the top of the sliding plate E' until that plate has been drawn backward, when it falls and effectually bars the forward passage of the plate E' until the door D is closed, during which the inclined end of the plate T forces the gravity-catch M' upward. When the door is open and the bag removed both the sliding plates T and E' are under the lug G, which effectually prevents any manipulations from the inside of the box from tilting the platform.

The mechanism for preventing entrance into the receiving-bag while the same is being conveyed from the stations or cars to the general office consists in means for automatically locking the mouth-piece of the said bag during the act of withdrawing the same. This mouth-piece P' is similar in construction to the one described and shown in my application for a patent filed April 21, 1881, having a flange, Q', for attaching a bag, a sliding lock, R', which closes the opening in the mouth-piece when the bag is withdrawn, and side flanges, S', which slide in the guides S³ on the under side of the plate K. The sliding lock R' is also similar in construction, having the double-headed spring-pressed catch U' and the spring-pressed arm I', which perform the same functions as described in the former application, a sufficient description of them, however, being given in this application to understand their operation. When the mouth-piece P' is inserted in the guides the lower head of the catch U' is engaged in the opening V' at the rear end of the frame carrying the lock, and as the mouth-piece is shoved inward the spring-pressed arm I' meets the lower end of the disengaging-bolt H' and forces it upward, and allows the said spring-pressed arm to rise up in the sleeve G', and, together with the ridge W' on the top of the lock R', which strikes a projection on the under side of plate K, prevent the further ingress of the mouth-piece, at the same time the upper head of the catch U' strikes against an inclined surface on the under side of the plate K, which depresses the said head, and consequently elevates the lower head, which is resting in the opening V', and raises same, which allows the mouth-piece to be withdrawn by grasping the handle Y' and pulling on same until the hook a enters the lock, the lock in the meantime being prevented from moving by the spring-pressed arm I' resting in the sleeve G'. During this operation of withdrawing the mouth-piece and just as the same has been locked, a cam, D', on the top of the mouth-piece P', passes under the arm W³, the lower end of which projects through the bottom of the plate K and raises the same, which transmits the motion to the rock-shaft A², which in turn depresses the disengaging-bolt H' and forces the spring-pressed arm I' out of the sleeve G' and allows the drawer to be withdrawn. When the rock-shaft is turned during the last operation the gravity-catch is allowed to descend and lock the tilting platform.

I do not wish to confine myself to any particular form of lock, but any construction that will answer the above purposes and admit of the introduction of the parts above described can be used, but at the same time such lock should be so constructed that the catches could not be separated, and the lock brought up against the hook without locking same, which will prevent any tampering with the lock before it is introduced into the box.

Instead of using two catches, as shown and described in my previous application, I use a single catch so constructed that it can only be moved when the lock has reached the front end of the mouth-piece, thereby defeating any attempt to move the catch by the introduction of wedges, which would allow the lock to move from one end of the mouth-piece to the other without locking. This is accomplished in the following manner: The latch c is pivoted at d, and is provided with means for engaging with the hook a. The rear side of this latch is provided with means for engaging with the key or tumbler mechanism, and on the same side of the catch is a bolt, f, having a spiral spring surrounding same, which is constantly exerting pressure on the latch. This bolt passes through a slot, l, in one side of the lock and runs flush with the side of the mouth-piece, on which it bears. When the lock reaches the front end of the mouth-piece P' the bolt f comes opposite a cavity, g, in the side of the mouth-piece, into which it enters when the catch strikes the latch, or when the key is introduced for unlocking.

From the foregoing it will be seen that any attempt on the part of employés to possess themselves of the contents of the box will be foiled, and all collusions between them prevented, as it is impossible to withdraw the bag or open the door without locking the tilting platform, and consequently will be impossible to tilt any money purposely left on the tilting platform until the bag is replaced in position.

The door D is secured by an ordinary padlock, and all movements of the same are transmitted to the interior of the box to lock and unlock the tilting platform and bring the gravity-catch into and out of engagement with the sliding bolt or plate E'.

The several portions of my device are made of metal, and are secured together in any suitable manner.

It is evident that slight changes in the construction and relative arrangement of the different parts might be resorted to without departing from the spirit of my invention, and hence I would have it understood that I do not limit myself to the exact construction of parts shown and described, but consider myself at liberty to make such changes as come within the spirit and scope of my invention.

I make no broad claim to many essential features of construction and combinations of parts shown and described in this application, as such claims are embraced in my prior application filed April 21, 1881.

Having fully described my invention, what I claim as new, and desire to secure by Letters Patent, is—

1. In a fare-box, the combination, with a tilting platform and a sliding bolt or plate adapted to be actuated by the mouth-piece of the ticket or money drawer or bag, of a gravity-catch adapted to automatically lock the sliding plate or bolt, and constructed to be disengaged therefrom by a sliding bolt or plate actuated by opening and closing the door of the fare-box, substantially as set forth.

2. In a fare-box, the combination, with a rock-shaft for operating the tilting platform, of a sliding bolt or plate for locking said shaft against rotary movement, and a rock-shaft for actuating said sliding bolt or plate, said rock-shaft being provided with an arm that engages with a bolt for releasing the spring-bolt of the mouth-piece, and an arm that is actuated by a cam on the mouth-piece, substantially as set forth.

3. In a fare-box, the combination, with the mouth-piece of a drawer or bag, said mouth-piece provided with a cam, and a sliding lock having a spring-pressed catch, of a rock-shaft having an arm that engages with a bolt located in a sleeve in the upper wall of the guideway, and a pin that engages with the cam on the mouth-piece, and a sliding bolt or plate connected with the rock-shaft, for locking and unlocking the rock-shaft, through which the tilting platform is actuated, substantially as set forth.

4. In a fare-box, the combination with a sliding plate or bolt and means, substantially as described, for connecting the said bolt to the door of the fare-box, of a rock-shaft having a lug thereon, under which the said sliding bolt or plate is moved, and a gravity-catch having a lug thereon, with which the inclined end of the sliding plate or bolt engages and operates the gravity-latch, substantially as set forth.

5. In a fare-box, the combination, with the sliding plate or bolt E', adapted to be operated by the mouth-piece of the receiving-bag, of a gravity-catch situated in front of the said plate and adapted to automatically lock the sliding plate or bolt E' when the receiving-bag is withdrawn and the door is open, substantially as set forth.

6. In a fare-box, the combination, with the sliding plate or bolt E', adapted to be operated by the mouth-piece of the receiving-bag, of a gravity-catch situated in front of the said plate, and a sliding plate or bolt T, the latter adapted to engage with a lug or projection on the side of the said gravity-catch and automatically raise and lower the same when the door D is closed or opened, substantially as set forth.

7. In a fare-box, the combination, with a rock-shaft having a lug formed thereon, of a sliding plate or bolt T, adapted to be operated by the door D, and a sliding plate or bolt, E', adapted to be operated by the mouth-piece of the receiving-bag to lock the tilting platform, substantially as set forth.

8. In a fare-box, the combination, with a rock-shaft having a lug formed thereon, and a sliding bolt or plate, T, adapted to be operated by the door, and a sliding plate or bolt, E', adapted to be operated by the mouth-piece, of a gravity-catch situated in front of the sliding plate or bolt E', and adapted to automatically lock the same when the receiving-bag is withdrawn and the door open, substantially as set forth.

9. In a fare-box, the combination, with a rock-shaft having an arm adapted to engage with a cam on the mouth-piece of the receiving-bag, and a weighted arm engaging with a disengaging-bolt having lateral projections working in slits in the sleeve in which the said disengaging-bolt moves, and an upwardly-projecting arm engaging with the rear end of the sliding plate E', which is bent upward for the purpose, the said bent portion of the plate E' moving in a guide formed in the bearing B' of a rock-shaft having a lug with which the said sliding plate E' engages, and a gravity-catch adapted to lock the said plate E' when the receiving-bag is removed and the door D is open, substantially as set forth.

10. In a mouth-piece for fare-boxes, the combination, with a frame having a cavity formed therein at one side, near its front end, of a lock adapted to slide in said frame, and having a spring-pressed catch provided with a bolt adapted to enter the cavity in the side of the frame and allow the mouth-piece to be unlocked, substantially as set forth.

In testimony that I claim the foregoing I have hereunto set my hand.

GEORGE D. PAUL.

Witnesses:
CHAS. T. LAWSON,
MORITZ KITZMYER.